Aug. 11, 1942.  W. W. GARSTANG  2,292,630
DISTANT CONTROL VIBRATOR CURRENT-CONVERTING SYSTEM
Filed July 17, 1940  2 Sheets-Sheet 1
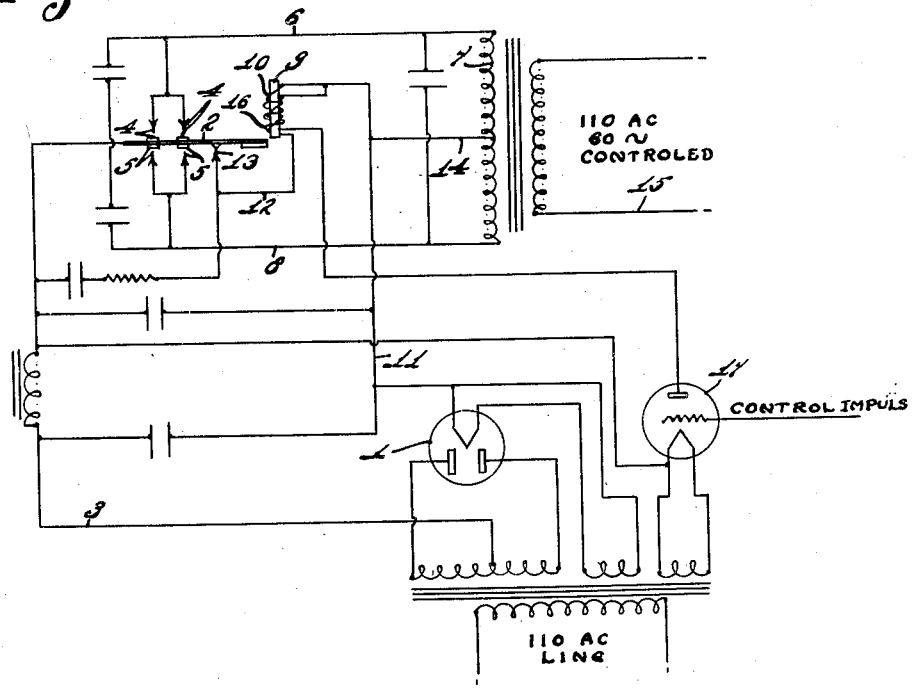
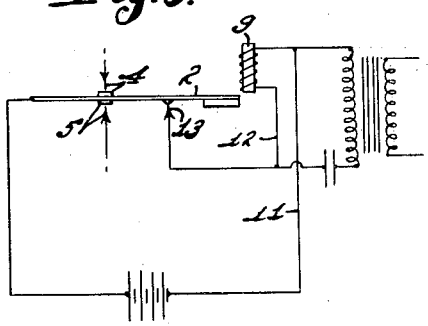
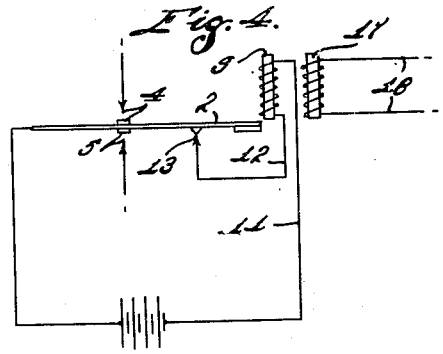
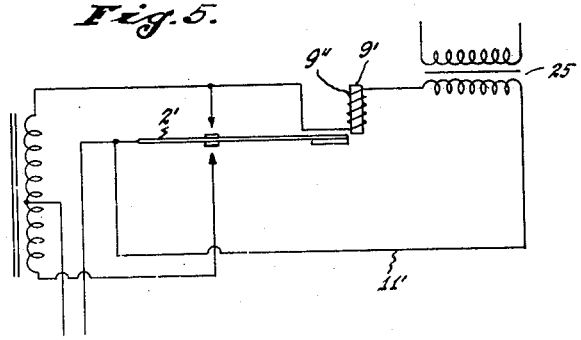
INVENTOR.
William W. Garstang,
BY
Hood & Hahn.
ATTORNEYS.

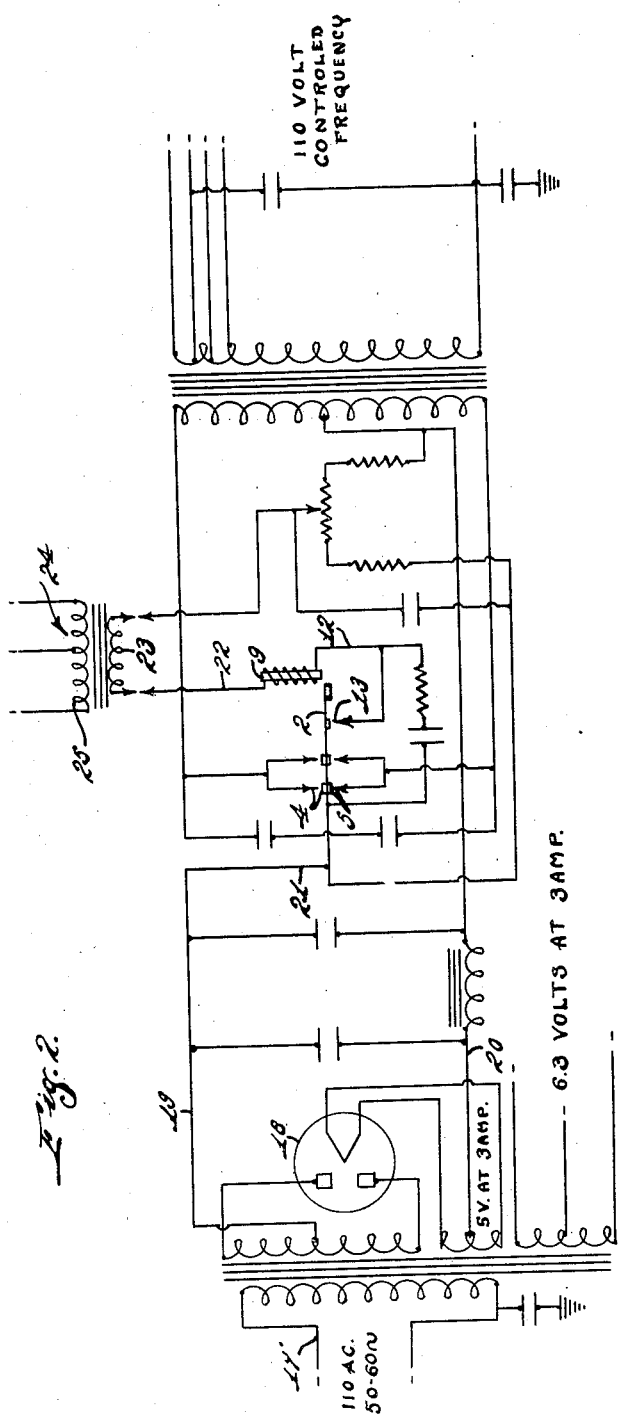

Patented Aug. 11, 1942

2,292,630

UNITED STATES PATENT OFFICE 2,292,630

DISTANT CONTROL VIBRATOR CURRENT-CONVERTING SYSTEM

William W. Garstang, Indianapolis, Ind., assignor to Electronic Laboratories, Incorporated, Indianapolis, Ind., a corporation of Indiana Application July 17, 1940, Serial No. 345,998

12 Claims. (Cl. 175—365)

The present invention relates to improvements in vibrator systems for delivering A. C. current in which the periods of the cycles of the delivered current are maintained uniformly accurate and constant. In certain types of apparatus, as for example, apparatus for transmission of illustrations, either by wire or radio, wherein the illustration is transmitted through an instrumentality using a sending cylinder which rotates at a predetermined speed and a receiving cylinder which rotates at a speed synchronized with the sending cylinder, it is essential that the two cylinders rotate in absolute synchronism throughout the sending period. One means which has been adopted for driving the receiving cylinder is a small alternating current operated motor. However, where this motor is driven from a separate source of power than that for driving the motor of the delivering cylinder, difficulty has been experienced in maintaining the motor in synchronism with that of the delivery cylinder, due to the fact that the cycle period of the operating motor may slightly vary over intervals of time and as a result, the driving motor speed will correspondingly slightly vary. For instance, the sending cylinder may be driven by a motor operating on 60 cycle A. C. current wherein the cycle period is absolutely controlled to uniformity. The receiving cylinder may be driven by a motor from 60 cycle A. C. source but it has been found from experience that such sources are not absolutely uniform in the cycle period and therefore there is a tendency for the two cylinders to get out of step.

By the use of my invention, I am enabled to deliver to the driving motor of the receiving station a 60 cycle A. C. current through the medium of a vibrator operated converter wherein the cycle period may be absolutely controlled from the sending station. The above, however, is merely one illustration of an application of my invention, as it is obvious that such an arrangement may be used in operating television apparatus, clocks and other timing equipment.

It is the object of my invention to provide a means for controlling the operation of a vibrator operated converting system whereby the output of the converter may be absolutely controlled.

For the purpose of disclosing my invention, I have illustrated a number of embodiments thereof in the accompanying drawings, in which:

Fig. 1 is a diagrammatic view of a circuit arrangement of a vibrating converter embodying my invention;

Fig. 2 is a diagrammatic view of a modified form of the circuit arrangement illustrated in Fig. 1;

Fig. 3 is a diagrammatic view showing a modification of the controlling means;

Fig. 4 is a diagrammatic view of a further modification; and

Fig. 5 is a diagrammatic view of a still further modification of my invention.

In the structure illustrated in Fig. 1, the source of power for the vibrator circuit includes an alternating current source operating say at 110 volts 60 cycles and this source of power includes an ordinary radio rectifier tube 1 adapted to convert the A. C. source of power to D. C. Connected in the D. C. circuit supplied as above is a vibrating converter including a vibrating reed 2 connected to one of the D. C. supply lines 3. This reed is provided with contacts adapted to alternately engage the oppositely disposed contacts 4, 4 and 5, 5, the contacts 4, 4 being connected by conductor 6 with one terminal of the primary 7 of a transformer. The contacts 5, 5 are adapted to be connected by a conductor 8 with the opposite terminal of the primary winding 7. The vibrating reed 2 is operated by an electromagnet 9, the operating coil 10 of which has one terminal connected to the opposite side 11 of the direct current supply. The other terminal of the coil 10 is connected by a conductor 12 with a contact 13 connected to the supply side 3 of the D. C. source and which is in normal engagement with a contact on the vibrating reed 2. A center tap for the primary winding 7 of the transformer is also connected by the conductor 14 with one side of the D. C. source. In operation, therefore, when current passes through the coil 10, the reed 2 will be set in vibration, being moved in one direction through the electromagnet 9. When moved in this direction, a circuit will be established through one section of the winding 7 from the line 3 through the reed 2, conductor 6 and conductors 14 and 11 to the opposite side of the line. At the same time that the reed 2 is moved to close this circuit, it also opens the circuit of the winding 10 which, it will be remembered, has been established through the contact 13 and a contact on the reed. The opening of this circuit immediately permits the reed to move in the opposite direction under the influence of its vibratory spring to a point where the contacts there will engage the contacts 5, 5, thereby establishing a current flow through the other section of the primary winding 7 in the opposite direction. It is thus seen that the vibrations of the reed deliver to the transformer coil 7 a series of impulses in opposite directions and, as a result, the transformer delivers to the load circuit 15 an alternating current of the determined frequency depending upon the tuning of the vibrator reed. This frequency may be 60 cycles or any other frequency determined upon.

I have found, however, that due to possible variations in the frequency of the A. C. supply circuit or due to possible variations, slight though they may be, in the operation of the vibrator reed, there is a slight variation in the frequency of the delivered current resulting in a variation of the device operated by the delivery current.

In order to control the frequency of the operation of the vibrator, I have found that by impressing on the vibrator operating circuit or the circuit including the winding of the electromagnet 9, a controlled circuit or a superimposed current, the frequency of which is absolutely controlled and the frequency of which is absolutely uniform, I can maintain the output of the converter to an absolute frequency. In the structure illustrated in Fig. 1, I have impressed upon the electromagnet 9 an absolutely controlled impulse in the form of a supplemental winding 16 with an A. C. current from a radio receiving tube 17 which receives the controlled impulse delivered say from a separate source which may be at a distant point. This controlled impulse may be of absolute frequency or of a frequency which, in the instance of a radio or wire transmission system for transmitting illustrations may be in absolute synchronism with the impulse driving the sending cylinder of such a system. The impulse need not be extremely heavy but I have found that by imposing this controlled impulse on the circuit of the electromagnet of the vibrating converter, that the output of the converter will be in exact accordance with this controlled impulse. Accordingly, variation of the frequency of the output of the vibrating converter may be rendered absolutely uniform by imposing thereon an absolutely uniform frequency impulse; or, if it is desired, by modifying the frequency impulse within a certain limit, the frequency output of the converter may be accordingly modified.

In the circuit arrangement illustrated in Fig. 2, I have shown a modification of my invention wherein the control impulse for the electromagnet of a vibrator is supplied from a transformer. In this arrangement, the alternating current supply circuit 17' is converted into D. C. by suitable rectifier tube 18 whereby a D. C. supply including the supply lines 19 and 20 is provided for the vibrator converter circuit 21 which is similar to the circuit illustrated in Fig. 1. Impressed upon the operating circuit 22 of the electromagnet 9 of this vibrator circuit is a controlled impulse provided by a secondary winding 23 of a transformer 24, the primary winding 25 of which is supplied with a controlled source, supplied from a controlled source of supply. It will be noted that in this instance, the secondary 23 is in series with the winding of the electromagnet 9. However, in this instance, as well as in the circuit illustrated in Fig. 1, although the impressed control current may be very small, it is effective in controlling the operation of the electromagnet.

In the structure illustrated in Fig. 3, I have illustrated, by a simplified diagram, a superimposed alternating current impulse in a shunt circuit around the operating circuit of the electromagnet of the vibrator, and in Fig. 4, I have illustrated a further modification wherein the control impulse is impressed upon the operating circuit of the electromagnet by induction. In this structure, it will be seen that I have provided in proximity to the electromagnet 9 an electromagnet 17 included in a circuit 18 which is the control circuit. By controlling the frequency of the circuit 18 either for variation or by maintaining the circuit 18 in absolute frequency, a control impulse is impressed upon the electromagnet 9 which will absolutely control the same. Various modifications of the circuit arrangement, other than those I have illustrated herein, may be used. In each instance, however, I provide a control impulse which is superimposed upon the normal operating impulse for the electromagnet of the vibrator to control the operation of the vibrator. I have found that this superimposed impulse need be very small and need be very light. Therefore, I am enabled to provide the relatively strong operating current for the electromagnet and by superimposing upon the operating circuit of the electromagnet, a relatively light control impulse, I am enabled to control the operation of the electromagnet within small limits, or I am enabled by superimposing upon the circuit of the electromagnet a very light control impulse which control impulse in itself is absolute as to frequency, to maintain the frequency of the output of the vibrator operated converter system to absolutely uniform frequency.

In Fig. 5, I have illustrated a further modification of my invention wherein there is shown a shunt circuit drive for the vibrating reed. In this structure, it is to be noted that the driving magnet 9' is in a shunt circuit 11' controlled by the vibrating reed switch 2' and that the winding 9" of the magnet which is the operating winding of the magnet has impressed thereon a control impulse from the windings 25.

Where I refer in the claims to the circuit of the electromagnet, I comprehend either the magnetic or electric circuit of said magnet.

I claim as my invention:

1. A circuit including a primary winding of a transformer, a vibratory switch, a source of direct current adapted to supply such winding through said switch, vibrating and stationary contacts on said switch adapted to alternately open and close the circuit through at least a portion of said winding in opposite directions, an electromagnet including an energizing winding for said switch energized from said source, and means for impressing upon the circuit of said energizing winding a controlling electrical impulse independent of the transformer circuit.

2. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet including an energizing winding for said switch energized from said source, and means for impressing upon the circuit of said energizing winding a controlling electrical impulse of less energy than that required to operate said switch independent of the transformer circuit.

3. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet including an energizing winding for said switch energized from a suitable source of direct current supply, and means for impressing upon the circuit of said energizing winding, a controlling electrical impulse independent of the transformer circuit.

4. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet including an energizing winding for said switch energized from said source, and means for impressing upon said circuit of said energizing winding an alternating controlling electrical impulse independent of the transformer circuit.

5. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet including an energizing winding for said switch energized from a suitable direct current source, and means for impressing upon the circuit of said energizing winding an external alternating impulse.

6. A circuit including a primary winding of a transformer, a vibrating switch, a source of direct current adapted to supply said winding through said switch, movable and stationary controls on said switch adapted to alternately open and close the circuit through at least a portion of said winding in opposite directions, an electromagnet having an energizing winding for said switch energized from said source, and means for imposing on said electromagnet an alternating impulse of less energy than the energy supplied from the source for operating said switch and independent of the transformer circuit.

7. A circuit including a primary winding of a transformer, a vibratory switch, a source of direct current adapted to supply said winding through said switch, movable and stationary contacts on said switch adapted to alternately open and close the circuit through at least a portion of said winding in opposite directions, an electromagnet including an energizing winding for said switch energized from said source, and means for impressing upon the circuit of said energizing winding, a controlling electromagnetic impulse having a separate source of energy.

8. A circuit including a primary winding of a transformer, a vibratory switch, a source of direct current adapted to supply said winding through said switch, movable and stationary contacts on said switch adapted to alternately open and close the circuit through at least a portion of said winding in opposite directions, an electromagnet having an energizing winding for said switch having an energizing circuit including a direct current source, and means for inducing in said energizing circuit a controlling electromagnetic impulse independent of said transformer circuit.

9. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet having an energizing winding for said switch energized from said source and having its supply circuit alternately opened and closed by said switch, and means independent of said transformer for impressing upon the circuit of said energizing winding an electromagnetic controlling impulse.

10. A circuit including a primary winding of a transformer, a vibratory switch, a source of direct current adapted to supply said winding through said switch, movable and stationary contacts on said switch adapted to alternately open and close the circuit through at least a portion of the said winding in opposite directions, said switch having an armature, an electromagnet having an energizing winding for said switch energized from said source, and means for impressing upon said armature an external controlling electromagnetic impulse.

11. A circuit including a source of direct current, a vibratory switch connected with said source having movable and stationary contacts, an electromagnet having an energizing winding for said switch having a direct current supply circuit alternately opened and closed by said switch, and external impulse means for controlling the impulse of the vibratory member of said switch.

12. A circuit including a primary winding of a transformer, a vibratory switch, a source of direct current adapted to supply said winding through said switch, vibrating and stationary contacts on said switch adapted to alternately open and close the circuit through at least a portion of said winding in opposite directions, an electromagnet including an energizing winding for said switch energized from said source, and means for impressing upon the circuit of said electromagnet a controlling electrical impulse independent of the transformer circuit.

WILLIAM W. GARSTANG.